US012800058B2

(12) United States Patent
Zhang et al.

(10) Patent No.: US 12,800,058 B2
(45) Date of Patent: Nov. 17, 2026

(54) TORQUE-SENSING SYSTEM FOR VALVE ACTUATORS

(71) Applicant: Emerson Process Management Valve Automation, Inc., Houston, TX (US)

(72) Inventors: Toni Zhang, Houston, TX (US); Stephen Jones, Palm Beach Gardens, FL (US); Leo Minervini, Paramus, NJ (US)

(73) Assignee: Emerson Process Management Valve Automation, Inc., Houston, TX (US)

( * ) Notice: Subject to any disclaimer, the term of this patent is extended or adjusted under 35 U.S.C. 154(b) by 0 days.

(21) Appl. No.: 19/102,220

(22) PCT Filed: Aug. 23, 2023

(86) PCT No.: PCT/US2023/072716

§ 371 (c)(1),
(2) Date: Feb. 7, 2025

(87) PCT Pub. No.: WO2024/044627

PCT Pub. Date: Feb. 29, 2024

(65) Prior Publication Data

US 2025/0243947 A1 Jul. 31, 2025

Related U.S. Application Data

(60) Provisional application No. 63/400,294, filed on Aug. 23, 2022.

(51) Int. Cl.
*F16K 31/528* (2006.01)
*F16K 37/00* (2006.01)

(52) U.S. Cl.
CPC ........ *F16K 31/528* (2013.01); *F16K 37/0041* (2013.01)

(58) Field of Classification Search
CPC .. F16K 31/528; F16K 37/0041; F15B 15/066; F15B 15/20; G01B 7/18
See application file for complete search history.

(56) References Cited

U.S. PATENT DOCUMENTS 4,542,649 A 9/1985 Charbonneau et al.
4,570,903 A 2/1986 Crass
(Continued)

FOREIGN PATENT DOCUMENTS

CN 107389472 A 11/2017
EP 0050466 A1 4/1982
(Continued)

OTHER PUBLICATIONS

Translation for WO 2015067883A1 (Year: 2015).*
(Continued)

*Primary Examiner* — Patrick C Williams
(74) *Attorney, Agent, or Firm* — Quarles & Brady LLP

(57) ABSTRACT

An actuator for a valve can include a torque module and a drive module that is configured to transmit rotational force from the torque module to a valve member (e.g., to selectively open and close the valve by rotating a flow control element thereof). A torque-sensing system can include a sensor element configured to detect a deformation of at least one of the torque module or the drive module, to monitor torque applied by the actuator to the valve.

14 Claims, 9 Drawing Sheets

(56) References Cited

U.S. PATENT DOCUMENTS

| | | | | |
|---|---|---|---|---|
| 4,787,245 | A | 11/1988 | Anderson et al. | |
| 4,805,451 | A | 2/1989 | Leon | |
| 4,856,327 | A | 8/1989 | Branam et al. | |
| 4,888,996 | A | 12/1989 | Rak et al. | |
| 4,912,984 | A | 4/1990 | McMennamy et al. | |
| 4,930,228 | A | 6/1990 | Anderson et al. | |
| 5,000,040 | A | 3/1991 | Charbonneau et al. | |
| 5,090,239 | A | 2/1992 | Balaschak et al. | |
| 5,142,906 | A | 9/1992 | Smith | |
| 5,469,737 | A | 11/1995 | Smith et al. | |
| 5,931,044 | A * | 8/1999 | Robert | G01L 5/0061 73/168 |
| 6,240,789 | B1 | 6/2001 | Morlan et al. | |
| 11,408,451 | B2 | 8/2022 | Schmidt et al. | |
| 2018/0087549 | A1 * | 3/2018 | Modinger | F16K 37/0041 |
| 2021/0123543 | A1 * | 4/2021 | Inoue | G05B 23/0283 |
| 2022/0146016 | A1 * | 5/2022 | Paradiso | F17D 5/00 |
| 2022/0349429 | A1 | 11/2022 | Schmidt et al. | |

FOREIGN PATENT DOCUMENTS

| | | | | |
|---|---|---|---|---|
| JP | 2002-070978 | A | 3/2002 | |
| WO | WO-2015067883 | A1 * | 5/2015 | G01L 5/0061 |

OTHER PUBLICATIONS

Nishizawa, Isao et al., Valve World Publisher, “Featured Story-Predition of valve health condition by angular velocity”, www://valve-word.net/prediction-of-valve-health-condition-by-angular-velocity/, Feb. 23, 2021, printed Mar. 2, 2022, 3 pages.

Warnett, C., Valve Actuators, “A Comprehensive introduction to the design, selection, sizing, and application of valve and damper actuators”, Oct. 2015, 245 pages.

* cited by examiner

TORQUE-SENSING SYSTEM FOR VALVE ACTUATORS

CROSS-REFERENCE TO RELATED APPLICATIONS

This application is a national stage application, filed under 35 U.S.C. § 371, of International Patent Application No. PCT/US2023/072716, filed on Aug. 23, 2023, which claims priority to U.S. provisional patent application No. 63/400,294, filed Aug. 23, 2022, each of which are herein incorporated by reference in their entirety.

BACKGROUND

Actuators of various types can be used to control movement of a valve, including to move a ball or other flow control element of a valve to control flow of fluid or other media through the valve.

SUMMARY

Changes in the torque required to operate a valve can be indicative of problems in the functioning of the valve (e.g., component wear) or the issues in the overall functioning of a fluid control system in which the valve is used. Thus, monitoring of patterns in the torque requirements of a valve during operation of a fluid control system may help provide an early warning of maintenance issues that may need to be addressed in the valve or fluid control system.

An actuator or a related sensing arrangement as described herein can provide torque or other rotation measurements for a valve actuator (e.g., in real-time during operation of the valve actuator), including for a Scotch yoke actuator in particular. For example, as described in more detail below, a sensing system of an actuator can monitor deformation of a torque module or drive module of the actuator to determine the torque output by the actuator. Such systems and corresponding monitoring can be generally beneficial for valve operation, including for monitoring patterns in torque requirements as noted above.

According to some examples of the disclosure, an actuator for selectively controlling the movement of an actuatable flow control element between a first configuration and a second configuration to control flow of fluid through a valve. The actuator can include a torque module, a drive module, and a torque-sensing system. The torque module can include an attachment body rotatable relative to a rotational axis and configured to engage a rotatable stem of the flow control element, and a drive-engagement component extending radially outwards relative to the attachment body. The drive module can include a drive member, and a force-transfer element. The force-transfer element can be configured to engage the drive-engagement component, responsive to a movement of the drive member, to apply a torque to the torque module for operation of the flow control element. A housing can enclose at least one of the torque or drive modules. The torque-sensing system within the housing can include a sensor element, wherein the sensor element is configured to detect a deformation of at least one of the torque module or the force-transfer element along an axis that extends transverse to the central axis during operation of the drive module to apply a torque to the torque module via the drive-engagement component According to some examples of the disclosure, an actuator can be configured for selectively controlling movement of an actuatable flow control element between a first configuration and a second configuration to control flow of fluid through a valve. The actuator can include a torque module that includes: an attachment body rotatable relative to a rotational axis and configured to engage a rotatable stem of the flow control element; and a drive-engagement component extending radially outwards from the attachment body, relative to the rotational axis. The actuator can further include a drive module that includes: a drive member; and a force-transfer element attached to the drive member and engaged with the drive-engagement component of the torque module. Responsive to a movement of the drive member, the force-transfer element can apply a torque to the torque module, via the drive engagement component, for operation of the flow control element to control fluid flow.

In some examples, a housing can enclose at least one of the torque module or the drive module and a torque-sensing system can be provided within the housing. The torque-sensing system can include a sensor element configured to detect a deformation of at least one of the torque module or the force-transfer element along an axis that extends transverse to the rotational axis, in response to operation of the drive module to apply a torque to the torque module via the drive-engagement component.

In some examples, the torque module comprises a Scotch yoke that includes the attachment body and the drive-engagement component.

In some examples, the attachment body comprises an annular sleeve centered about the rotational axis.

In some examples, the sensor element is attached along an exterior surface of the annular sleeve.

In some examples, a securement structure can be configured to engage the rotatable stem of the flow control element, the securement structuring being located along an inner surface of the annular sleeve. The sensor element can be attached along the exterior surface of the annular sleeve adjacent to the securement structure.

In some examples, the securement structure can include a keyed engagement feature formed along the inner surface of the annular sleeve. The sensor element can be attached along the exterior surface of the annular sleeve, with the sensor element and the securement structure within a common quarter-circumference region of the annular sleeve.

In some examples, the sensor element can include a strain gauge arranged to detect a deformation of the attachment body in a circumferential direction.

In some examples, the sensor element can include a plurality of strain gauges.

In some examples, the strain gauges can be arranged in a full-bridge configuration.

According to some examples of the disclosure, a Scotch yoke for actuation of a valve can include attachment body rotatable relative to a central axis. A securement structure can be provided on the attachment body, the securement structure configured to engage a corresponding structure of a rotatable stem of a flow control element. A drive-engagement component can extend radially outwards relative to the attachment body, the drive-engagement component being engageable by a drive module to apply a torque to the attachment body. A sensor element that is configured to detect, responsive to an application of a torque to the attachment body, a deformation of at least one of the attachment body or the drive-engagement component along an axis that extends transverse to the central axis.

According to some examples of the disclosure, a Scotch yoke is provided for actuation of a valve. The Scotch yoke can include an attachment body rotatable relative to a central axis, and a securement structure on the attachment body to secure the attachment body to a flow control element of the valve, via attachment to a corresponding structure of a rotatable stem of the flow control element. A drive-engagement component can extend radially outwards from the attachment body, relative to the central axis, the drive-engagement component being engageable by a drive module of an actuator to apply a torque to the attachment body and thereby transmit torque from the drive module to the flow control element. A sensor element can be provided such that, responsive to an application of a torque to the attachment body, the sensor element detects a deformation of at least one of the attachment body or the drive-engagement component along an axis that extends transverse to the central axis.

In some examples, the sensor element can include a strain gauge and, optionally or preferably, wherein the Scotch yoke comprises multiple sensor elements formed as a plurality of strain gauges arranged in a Wheatstone bridge configuration.

In some examples, the sensor element can be arranged on the attachment body.

In some examples, the drive-engagement component can include an arm having a first end secured along an exterior of the attachment body and a free end. The sensor element can be arranged on the arm.

In some examples, a slot can extend radially inward along the arm from the free end of the arm. The sensor element can be arranged adjacent the slot.

Some examples provide a method of monitoring operation of a valve. During movement of a drive module of an actuator of the valve that applies torque to an attachment body of a Scotch yoke of the valve via a drive-engagement component that extends from the attachment body, strain can be detected on the attachment body or the drive-engagement component with a sensor element arranged on the attachment body or the drive-engagement component. A torque applied to the Scotch yoke can be determined based on the detected strain.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology.

DETAILED DESCRIPTION

Figure 1:
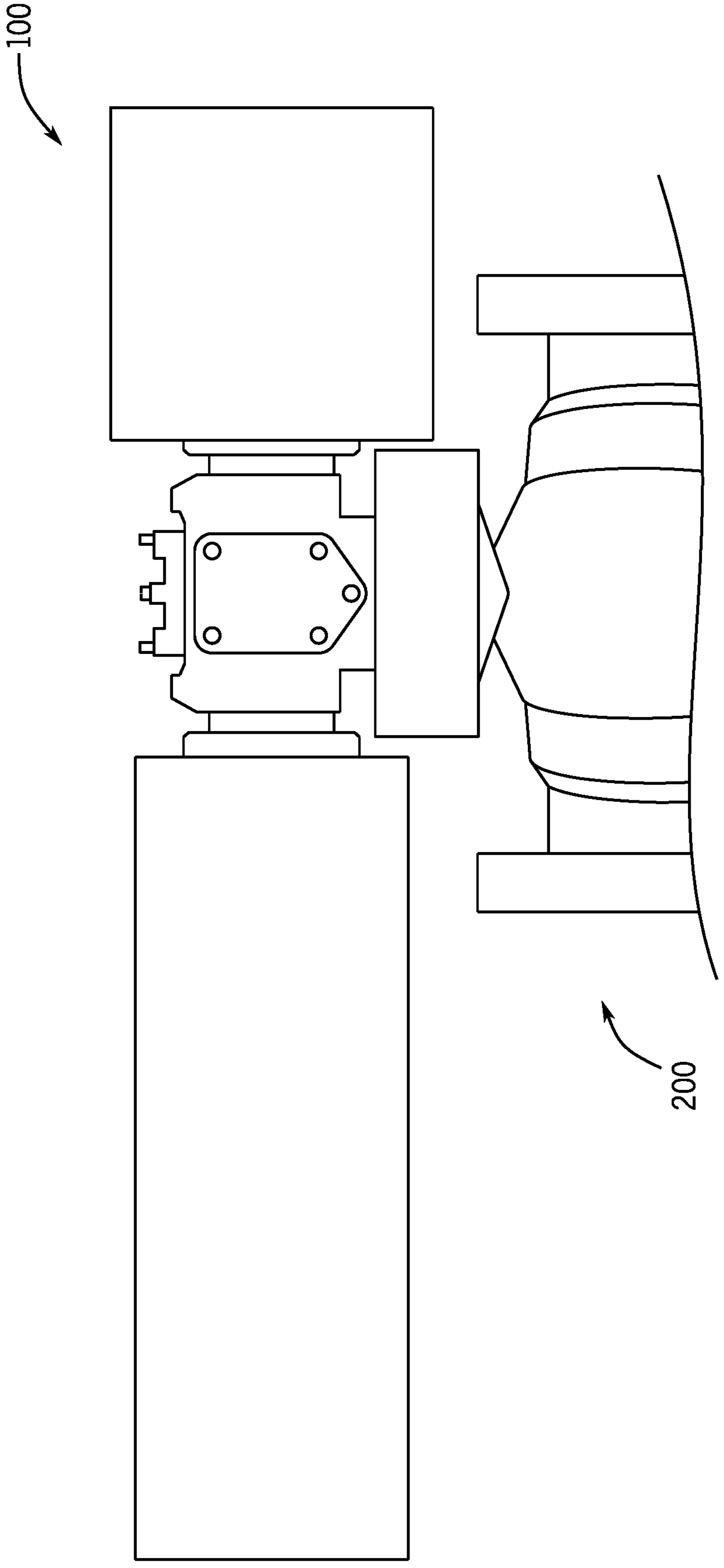
FIG. 1 illustrates an actuator mounted to a valve, in accordance to one example of the present disclosure.

Before any examples of the disclosed technology are explained in detail, it is to be understood that the disclosed technology is not limited in its application to the details of construction and the arrangement of components set forth in the following description or illustrated in the following drawings. The disclosed technology is capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use examples of the disclosed technology. Various modifications to the illustrated examples will be readily apparent to those skilled in the art, and the generic principles herein can be applied to other examples and applications without departing from principles of the disclosed technology. Thus, examples of the disclosed technology are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of examples of the disclosed technology. Skilled artisans will recognize the examples provided herein have many useful alternatives and fall within the scope of the disclosed technology.

As generally noted above, monitoring torque for operation of a valve actuator can be useful, including to identify potential issues that may require maintenance or replacement of an actuator, a valve, or various components thereof.

Some existing systems and methods monitor changes in valve torque indirectly, such as by calculating torque based on measurements of the amount of force exerted by an actuator during actuation of the valve (e.g., by monitoring pressure within a pneumatic piston of a linear actuator). However, such measurements are not typically directly reflective of the torque actually output by the actuator. Instead, they may rely on an assumed ideal operation of the actuator in calculating the relationship between measured force and output torque, and thus are susceptible to error. Accordingly, these conventional approaches may not always provide accurate measurement of torque during operation of a valve.

Load cells can allow for the direct measurement of the torque applied to a valve. However, existing load-cell systems for valve actuators suffer from a number of disadvantages that may render them ineffective in being adopted for the widescale use to monitor the health of a fluid control system. For example, the mounting requirements for existing load cells can require the load cell to be secured along a length of the valve stem at a location between the valve and the actuator. This may result in relatively uneconomical processes for retrofits or other installations. Further, in situations where an actuator is already secured to the valve stem, in the available mounting space along the valve stem may be insufficient for the mounting requirements of the load cell.

Even in situations in which the valve stem includes sufficient mounting space or in which an actuator that is to be instrumented with load cells has yet to be mounted to a valve, the use of conventional load cells and load-cell arrangements to monitor the health of a fluid control system may still face a number of challenges. For example, the conventional mounting location of a load cell between a valve and an actuator—e.g., as required by conventional valve, actuator, or load-cell configurations—can result in the load cell being detrimentally exposed to the ambient environment. Such an exposed arrangement of the load cell may thus limit the feasibility of incorporating existing loads cells into fluid control systems that operate in harsh (or other) environments.

Furthermore, because a load cell is typically provided as a separate component from the actuator, the mounting of the load cell relative to the valve requires additional time and effort apart from that required to mount the actuator relative to the valve. In fluid control systems that include a large number of valves, the additional time, effort, and cost required to incorporate a load cell onto each relevant valve of the fluid control system may thus render cause the conventional use of existing load cells to be an expensive and impractical solution for monitoring the health of the fluid control system.

An actuator or a related sensing arrangement as described herein can provide improved arrangements (and methods) for measuring torque or other rotational force parameters for a valve actuator (e.g., in real-time during operation of the valve actuator), including for a Scotch yoke actuator in particular. For example, as described in more detail below, a sensing system of an actuator can monitor deformation of a torque module or a drive module of the actuator to determine a torque output (e.g., real-time torque output) by the actuator. In contrast to operation of conventional sensing systems, the deformation of the components of the torque module or drive module, as measured by the disclosed sensing systems, can be directly reflective of changes in the torque requirements of a flow-control valve. Thus, generally, the torque measurements provided for the actuator under the disclosed arrangements can reliably reflect the actual torque output by the actuator and can thus be reliably used for diagnostic or other purposes accordingly.

In some cases, an actuator can include a housing that defines an inner cavity within which a drive module, a torque module, and a sensing system are housed. In such cases, because the sensing system is contained within the housing of the actuator, sensitive components of the sensing system can be protected from the ambient environment. Thus, such arrangements can be suitable for use even under harsh operating conditions. Additionally, the integration of the sensing system into the actuator housing may obviate the need for any additional effort or time to separately provide a flow-control valve with both actuating and torque-measuring functionality.

Generally, a torque module of an actuator includes an attachment body and a drive-engagement component. The attachment body is supported within the housing of the actuator in a manner that allows the attachment body to rotate relative to a rotational (e.g., central) axis about which the attachment body extends. In this regard, the attachment body can be used to secure the actuator relative to a rotationally actuatable member (e.g., a valve stem) of a flow-control valve, and thereby allow the transfer of actuation force, via the attachment body, between the actuator and the actuatable member. In this regard, some attachment bodies can be formed to include partially or fully circumferential sleeves or other similar structures that can engage a rotatable shaft that is in turn engaged with a rotatable flow control element (e.g., ball element, butterfly element, etc.). Thus, during operation of the actuator, rotation of the attachment body can result in a corresponding rotation of the actuatable member of the flow-control valve. In some examples, an attachment body can include a securement structure (e.g., a key or keyway, or various other structures) that engages a corresponding structure of the actuatable member (e.g., a keyway or key, or various other geometrically complementary structures) to rotationally fix the attachment body and actuatable member relative to one another.

Continuing, the drive-engagement component of the torque module can include a body member that extends between an attachment end and a force-receiving or free end (e.g., that extends radially from an attachment end secured the attachment body to a distal, free, force-receiving end). An engagement structure can be provided (e.g., near the force-receiving end of the body member). The engagement structure may include a separate component that is secured to the force-receiving end of the body member (e.g., a pin or other protrusion). Alternatively (or additionally), the engagement structure may be defined by a portion of the force-receiving end of the body member. For example, an engagement structure may comprise a slot formed along the force-receiving end of the body member that can receive a corresponding protrusion on an actuator assembly.

As alluded to above, the attachment end of the body member can be fixedly secured relative to an outer surface of the attachment body, so that rotation of the attachment body relative to a central axis can cause corresponding movement of the body member. In some examples, the body member can thus extend along an axis that is angled (i.e., is not parallel) relative to the central axis. For example, the body member can extend along an axis that is substantially perpendicular to the central axis or otherwise extends radially outwardly relative to the central axis. Accordingly, the force-receiving end of the body member (and the engagement structure provided thereon) can be radially offset from the outer surface of the attachment body.

The drive module of the actuator can include a force-transfer element and a drive member. The drive member can be operably connected to a power source so that, during operation of the actuator, power received by the drive member from the power source actuates a movement of the drive member relative to the housing. For example, a drive member can be formed as unitary or assembled rod structure that can transfer force linearly (or otherwise). The force-transfer element can be configured to transfer force from the drive member to the body member (as generally discussed above) and thus is generally supported fixedly relative to a main axis of movement of the drive member. For example, a force-transfer element can be a pin or other protrusion that engages a slot on a body member, or can be otherwise configured to transfer force from the drive member to the body member. Thus, movement of the drive member responsive to the operation of the power source can effectuate a corresponding movement of the force-transfer element. This movement of the force-transfer element, in turn, can then cause a corresponding movement of the body member, as further discussed below.

Correspondingly, the torque module and the force-transfer element of the drive module can include various engagement structures that inter-engage with each other to operatively connect the torque module to the force-transfer element. Generally, the engagement structure and force-transfer element are supported relative to one another within the housing such that the force-transfer element operably engages the engagement structure during movement of the force-transfer element. During operation of the actuator, this interaction between the force-transfer element and the engagement structure can result in the movement of the force-transfer element being transmitted into a movement of the force-receiving end of the body member.

Given the generally radially offset arrangement of the force-receiving end of the body member relative to the attachment body, and the generally fixed relationship of the attachment body relative to the central axis (e.g., with the attachment body is substantially constrained against translational movement relative to the rotational axis), the above-noted movement of the force-receiving end of the body member, as effectuated by the drive module, can subject the attachment body to torque. Because of the rotationally fixed securement of the attachment body relative to the actuatable member, the torque imparted onto the attachment body thus can correspond to torque imparted onto the actuatable member and corresponding rotation of the attachment body and the actuatable member. Accordingly, the drive module and the torque module of the actuator are able to utilize power from the power source to selectively control the movement of the actuatable member between first and second rotational positions to effectuate a desired transition of the flow-control valve between first and second operational states (e.g., between flow and no-flow states, or between flow states permitting different flow rates at a given pressure drop).

In this and other arrangements, a sensing system of an actuator can include one or more sensor elements that detect parameters that are indicative (e.g., are direct measurements) of the torque required to operate the actuatable member of the flow-control valve to which the actuator is secured. In particular, at least one of the sensor elements of the sensing system can include a strain sensor, arranged to sense deformation of one or more components of a valve so as to determine the torque being applied. For example, during operation of the actuator, the engagement of the components of the drive module and torque module to transfer movement of the force-transfer element into rotation of the actuatable member of the flow-control valve can subject one or more the components of the drive module and torque module to stress/strain (e.g., compressive, tensile, torsional, shear, etc.), leading to deformations in portions of the drive module and torque module. These deformations can be sensed as strain in the relevant component(s) and a corresponding torque on the component can then be readily determined based on the sensed strain.

As will be appreciated, varying the torque requirements of the actuatable member will correspondingly affect the amount of force that the components of the drive module and torque module are subject to during operation of the actuator. Such variation can thus also affect the degree of deformation experience by the drive module and torque module. Accordingly, by measuring the degree of deformation of the components of the torque module or drive module, the sensors of the sensing system can allow for a direct measurement of the torque to which the actuatable member is subject during operation of the actuator.

Generally, one or more deformation sensors of the sensing system can be secured along one or more torque detection regions on one or both of the drive module or torque module. During operation of the actuator, each deformation sensor can thus monitor the degree of deformation of the torque detection region to which it is secured. For example, one or more sensors can be arranged so that each (or some) of the sensors monitors a degree of deformation in a direction that is non-parallel to the relevant rotational axis (e.g., in a radial, circumferential, or other similar direction). In this regard, any of a variety of known types of strain sensors can be used to measure deformation in some examples.

The torque detection regions along which the deformation sensors are secured may correspond to a variety of locations along a torque module or a drive module. In some cases, deformation sensors can be arranged to maximize or otherwise optimize detected magnitude and detection confidence for torque-induced deformation. For example, the degree of deformation experienced along a structure may be greatest at, or adjacent to, a point on the structure that is directly subject to a stress- or strain-inducing force. Accordingly, in order to improve the precision with which the degree of deformation of a torque detection region may be assessed, the torque detection regions may advantageously correspond to locations that are adjacent to a contact point at which force is directly imparted by/to the torque module or drive module.

In some cases, however, some spacing can be provided between a contact point and the placement of a sensor. For example, selecting a torque detection region that is adjacent to, but slightly offset from the force contact point (i.e., as opposed to immediately adjacent to the force contact point) may advantageously provide an effective surface along which the deformation caused by the force may be amplified. This, in turn, may improve the resolution of the deformation measurement signal obtained by the deformation sensor.

According to various examples, at least one torque detection region along which a deformation sensor is secured can correspond to a location along an attachment body that can provide transfer of forces between a valve (e.g., a valve stem) and an actuator. In some cases, such a location along the attachment body can correspond to a portion of the attachment body that is adjacent to the securement structure. As discussed above, the transmission of torque between the attachment body and the actuatable member is possible due to the rotationally fixed engagement provided by the inter-engagement of the securement structure and the corresponding structure of the actuatable member. During operation of the actuator, this inter-engagement between the securement structure and the corresponding structure of the actuatable member can result in the actuatable member imparting a reactive force onto the securement structure, which in turn can cause a deformation of portions of the attachment body adjacent to where the securement structure extends. Thus, locating a deformation sensor along a portion of the attachment body near the location of the securement structure may increase the resolution of the deformation signal obtained by deformation sensor.

In addition (or as an alternative) to at least one deformation sensor, according to some examples, a sensing system can include at least one sensor that is able to detect the speed and direction of the movement of the torque module or drive module. Thus, for example, a controller of the sensing system can sometimes utilize readings from sensor elements (e.g., the deformation sensor and the movement sensor) to fully determine the torque vector being applied to the actuatable member. Such a controller may also monitor patterns in torque measurements over time (e.g., based on signals from a deformation sensor alone, or from a deformation and speed/direction sensor), and may analyze these patterns to diagnosis (e.g., evaluate historically, or predict for future operation) the operation of the flow-control valve. Thus, in some cases, actuators according to this disclosure (and related sensing arrangements, etc.) may provide a reliable early warning of maintenance issues that may need to be addressed in a flow-control system (e.g., potential stuck-valve or valve-failure conditions).

Generally, a controller can include a processor device (e.g., a general or special purpose computer, or various generally known industrial controllers) and an onboard storage (e.g., a memory module of various known types) that is able to store sensor element measurements or other data. Additionally, or alternatively, the controller can include a wireless (or other) communications interface via which sensor element readings or related data can be transmitted to external computing systems for processing. The controller thus may allow for real-time torque and rotation monitoring.

Generally, a controller may thus implement a variety of methods via which torque values are determined based on deformation measurements obtained by a deformation sensor (e.g., via known correlations between the sensed parameters and actual strain, correlations between actual strain and applied torque, etc.). For example, in some cases the controller may be configured to obtain baseline measurements related to the operation of the actuator upon an initial installation of the actuator relative to the flow-control valve. These baseline measurements can be stored by the controller and used as a reference state against which subsequent measurements obtained during the normal use of the actuator can be compared. In some examples, the controller may additionally, or alternatively, store reference data that correlate various measured parameter values to corresponding torque measurements (generated during calibration testing of the actuator prior to its use with the flow-control valve), against which the controller may compare measurements obtained by the sensor elements during use of the actuator to determine torque output.

As discussed above, changes in the operating characteristics of a flow control valve may be indicative of changes in the overall operation of a fluid control system in which the flow-control valve is used. Accordingly, in some examples, torque data from the controller may be provided to a control system of the fluid control system in which the flow-control valve is incorporated. The control system of the fluid control system may then utilize this data to monitor operation of the fluid control system and thereby diagnose or predict various issues, or may otherwise utilize this data as part of a closed-loop (or other) algorithm via which operation of the fluid control system is controlled.

Figure 2:
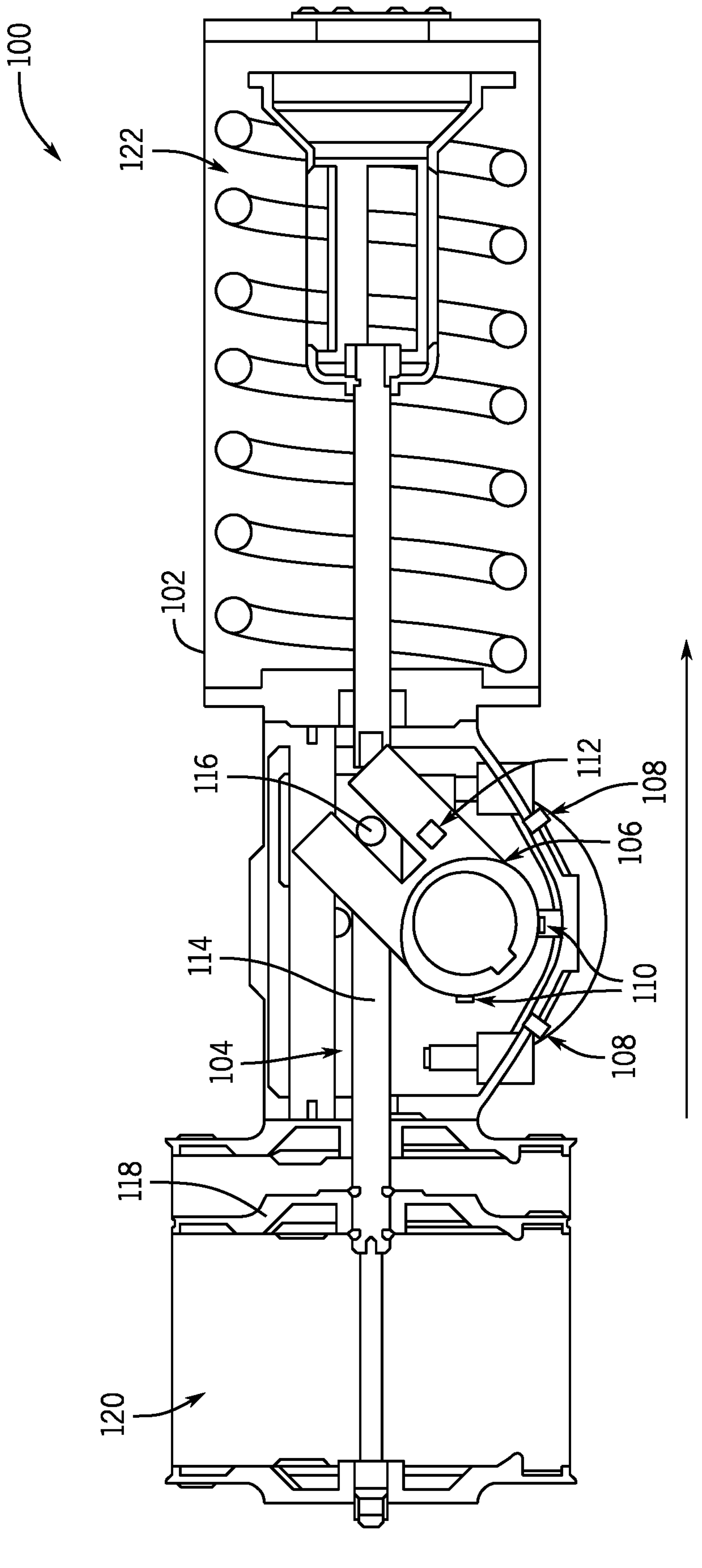
FIG. 2 is a cross-sectional view of the actuator of FIG. 1, in accordance to one example of the present disclosure.

Turning to the specific examples of the Figures, an actuator 100 (see, e.g., FIG. 1) including a Scotch yoke torque module 106 (see, e.g., FIG. 2) is shown and described according to various example configurations. As illustrated in FIG. 2, in particular, the actuator 100 includes a housing 102 within which a drive module 104 and a torque module 106 are housed. The housing 102 may have separate compartments (or sub-housings) that enclose the drive module 104 or other components and may include openings 108 (or other features) that provide an interface via which the sensor elements (e.g., a strain gauge 110 and a gyroscope 112 (see, e.g., FIG. 4), or other inertial sensor) of the actuator 100 may be wired to a controller (not shown) of the actuator 100 (e.g., with the controller forming part of the actuator 100, being attached externally to the housing 102, etc.).

The example actuator 100 shown in the Figures is a pneumatic piston actuator according to generally known designs, although other configurations are possible that use generally known actuators to provide actuation force to a torque module to actuate a valve. In particular, in the illustrated example, the drive module 104 of the actuator 100 includes a drive member including a push rod 114 and a force-transfer element including a pin 116 that is secured along a length of the push rod 114. As shown in FIG. 2, a first end of the push rod 114 is secured to a piston 118. The piston 118 is slidably disposed within a fluid chamber 120 defined by the housing 102.

The interior or the fluid chamber is fluidly coupled to a power source (not shown), such as one of various known pneumatic pressure/flow sources. During operation of the actuator 100 to control the operation of a flow-control valve 200, the power source (not shown) can operate to selectively fill the fluid chamber 120 with fluid (e.g., air, a liquid, etc.). As the fluid chamber 120 is filled with fluid, the piston 118 can be displaced from a first, unactuated position (not shown) to a second, actuated position (see, e.g., FIG. 2). This displacement of the piston 118 between the first position and the second position results in a corresponding linear movement of the push rod 114 in a direction indicated by the arrow in FIG. 2.

As illustrated in FIG. 2, in some examples, a second end of the push rod 114 can be operably attached to a counter-biasing element 122. During operation of the power source, the movement of the piston 118 responsive to the filling of the fluid chamber 120 (and the corresponding linear movement of the piston rod 114) causes the second end of the push rod 114 to compress the counter-biasing element 122. Upon deactivation of the power source, the energy stored by the compressed counter-biasing element 122 urges the piston 118 (and push rod 114 secured thereto) towards its first, unactuated position. In other examples, however, other configurations are possible. For example, some examples may include double-acting actuators, which can actively (e.g., pneumatically) power actuation of a valve in two directions.

Figure 3:
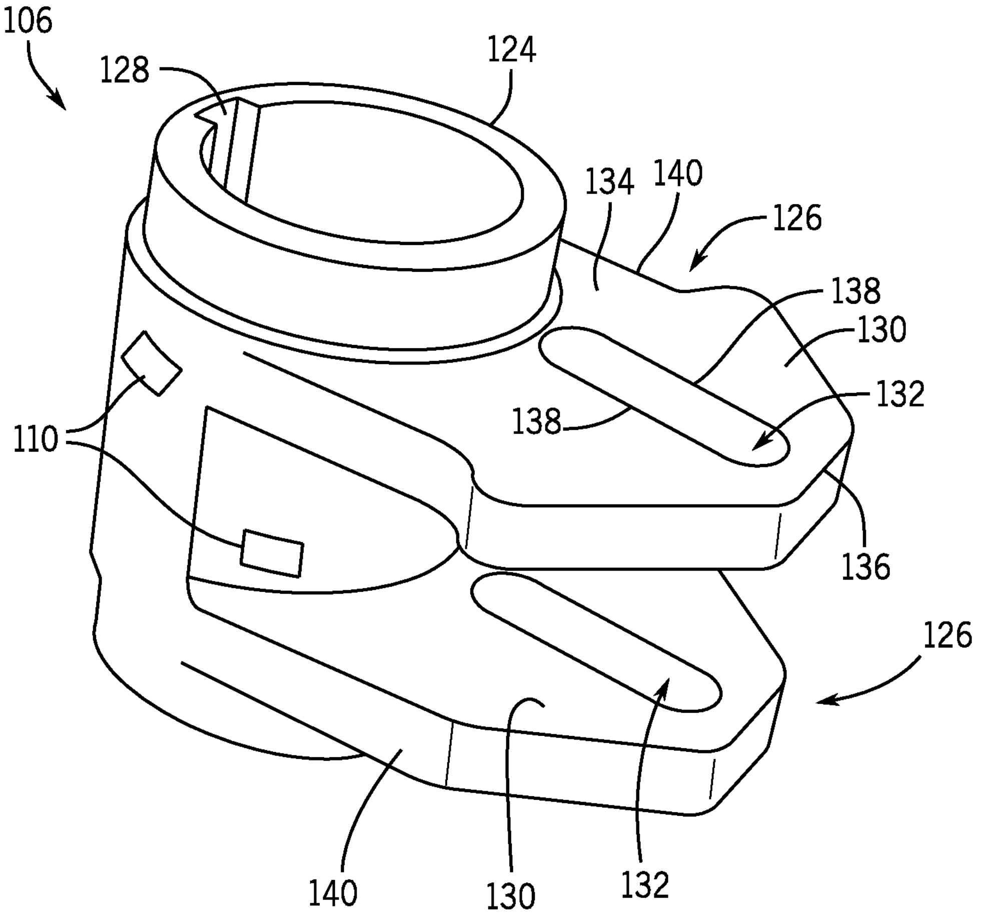
FIG. 3 is a perspective view of a torque module for the actuator of FIG. 1, with deformation sensors secured thereto, in accordance to one example of the present disclosure.

As shown in FIG. 3, the torque module 106 of the actuator 100 includes a Scotch yoke. In particular, the Scotch yoke includes an attachment body including an annular sleeve 124, and a drive-engagement component including a yoke 126 (e.g., a one-sided, two-arm yoke, as shown). A securement structure including an axially extending keyway 128 is formed along an interior surface of the annular sleeve 124. In other examples, other securement structures are possible (e.g., a key configured to engage a corresponding keyway on a valve stem, a set-screw arrangement, etc.).

Figure 4:
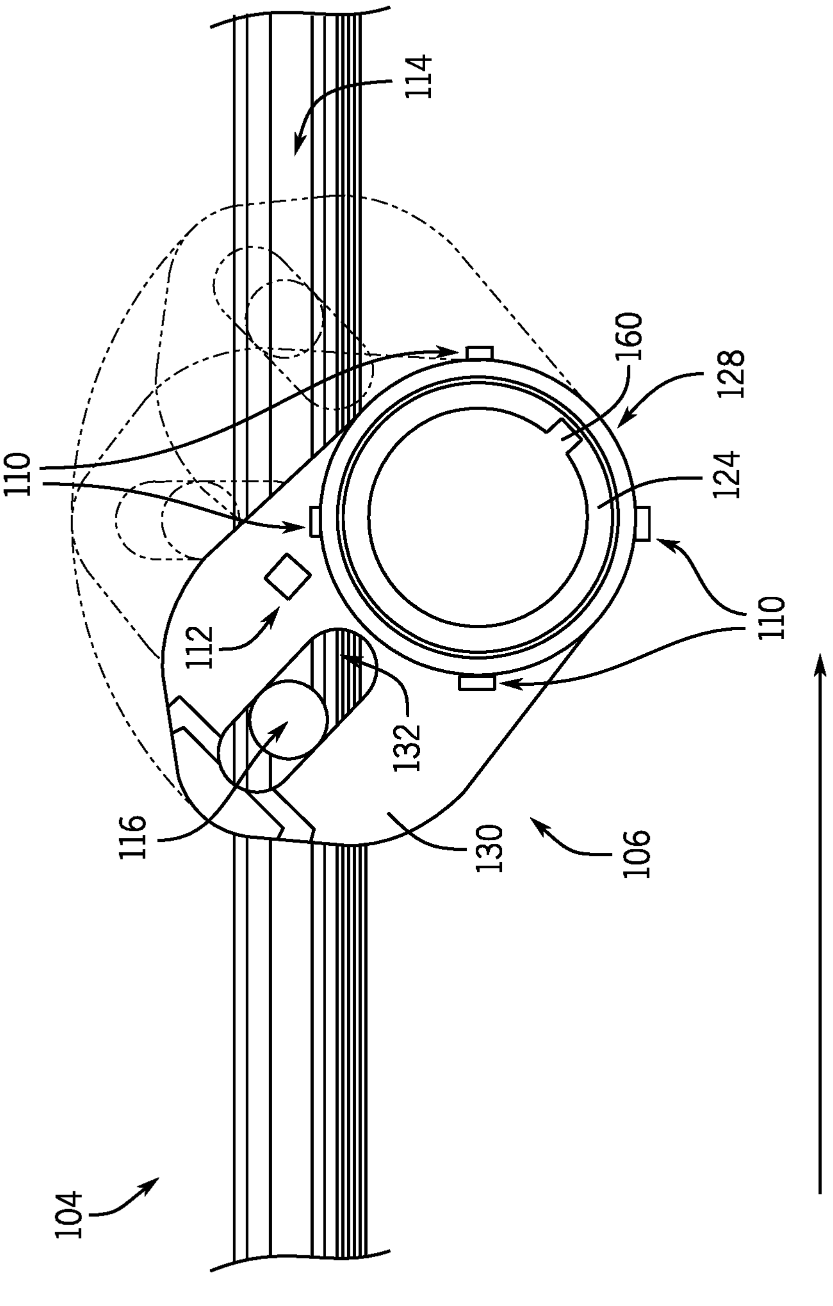
FIG. 4 representatively illustrates the engagement of a drive module and the torque module of FIG. 3 during operation of the actuator of FIG. 1, in accordance to one example of the present disclosure.

During installation of the actuator 100, the keyway 128 is aligned with a corresponding axially extending key formed along an exterior surface of the valve stem of the flow-control valve 200 that is to be controlled by the actuator 100 (see, e.g., key 160 of FIG. 4). Upon securement of the annular sleeve 124 relative to the valve stem, the interaction between the key of the valve stem and keyway 128 (or other securement structures) rotationally fixes the annular sleeve 124 and valve stem relative to one another. Accordingly, rotation of the annular sleeve 124—and the Scotch yoke generally, results in a corresponding rotation of the valve stem.

As also noted above, in other examples a securement structure of an attachment body may include a variety of structures or features, including a variety of generally known mechanical connection structures, via which a torque module may be secured in a rotationally fixed arrangement relative to a valve stem of the corresponding flow-control valve (e.g., the valve 200). In this regard, for example, a keyway (e.g., keyway 128) and a corresponding key (e.g., on a valve stem) can each be considered a keyed engagement feature, and it should be understood that some sleeves or other attachment bodies (e.g., as otherwise similar to the sleeve 124) can include keyed engagement features configured variously as a keyway or a recess, with a corresponding recess or keyway formed on the counterpart valve stem.

Referring still to FIG. 3, in particular, the yoke 126 includes a body member including a drive-engagement component configured as an arm 130, and an engagement structure including a slot 132. The arm 130 includes a first end 134 (i.e., an attachment end) that is secured relative to an exterior surface of the annular sleeve 124, and a second free end 136 (i.e., a force-receiving end) that is radially offset from the exterior surface of the annular sleeve 124. As illustrated by FIG. 3, according to various examples, the slot 132 is defined by one or more walls 138 of the arm 130. In other examples, other configurations are possible, including configurations having arms or other yoke structures of different configurations, including yoke structures with other engagement structures (e.g., with a force-transmitting pin in place of the slot 132).

In some examples the torque module 106 includes a single yoke 126. Alternatively, as illustrated by the example of FIG. 3, the torque module 106 may include a plurality of yokes 126 that are axially spaced in a parallel arrangement along a height of the annular sleeve 124. As illustrated by the example of FIG. 3, a first yoke 126 may extend outwardly from an upper portion of the annular sleeve 124 and a second yoke 126 may extend outwardly from a lower portion of the annular sleeve 124. In other examples, as also discussed below, one or more yokes can extend in each of multiple directions from a body member (e.g., in opposing directions, as illustrated in FIG. 5F).

The yoke 126 may be defined by a variety of structures. For example, as shown in FIG. 3, in some examples the yoke 126 includes a closed-yoke arrangement (i.e., in which the walls 138 of the arm 130 fully enclose the slot 132). As further examples, including as shown in FIGS. 5B-5G, the slot 132 (or the plurality of slots 132 in the examples of FIGS. 5F and 5G) is only partially enclosed by the walls 138 of the arm 130 (e.g., may be open at a free end 136 of the relevant arm 130).

Figure 5A:
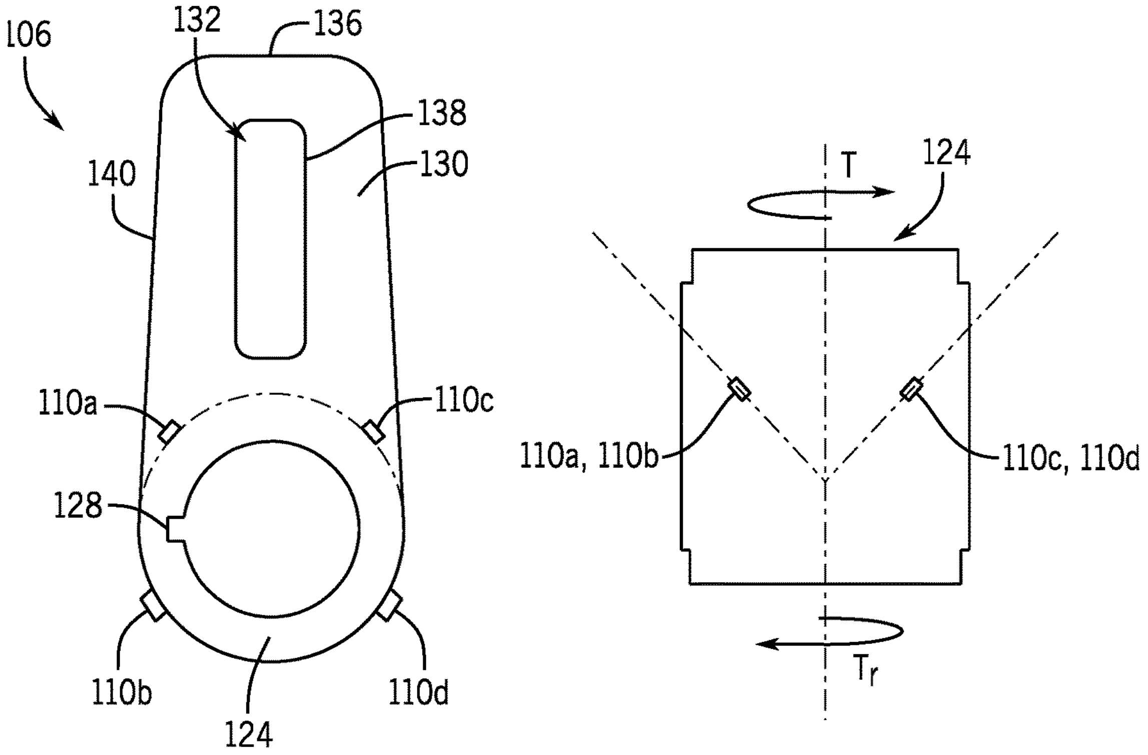
FIGS. 5A-5G illustrate partly schematic top and side elevation views of mounting arrangements for deformation sensor of a torque module, in accordance to various examples of the present disclosure.
Figure 5B:
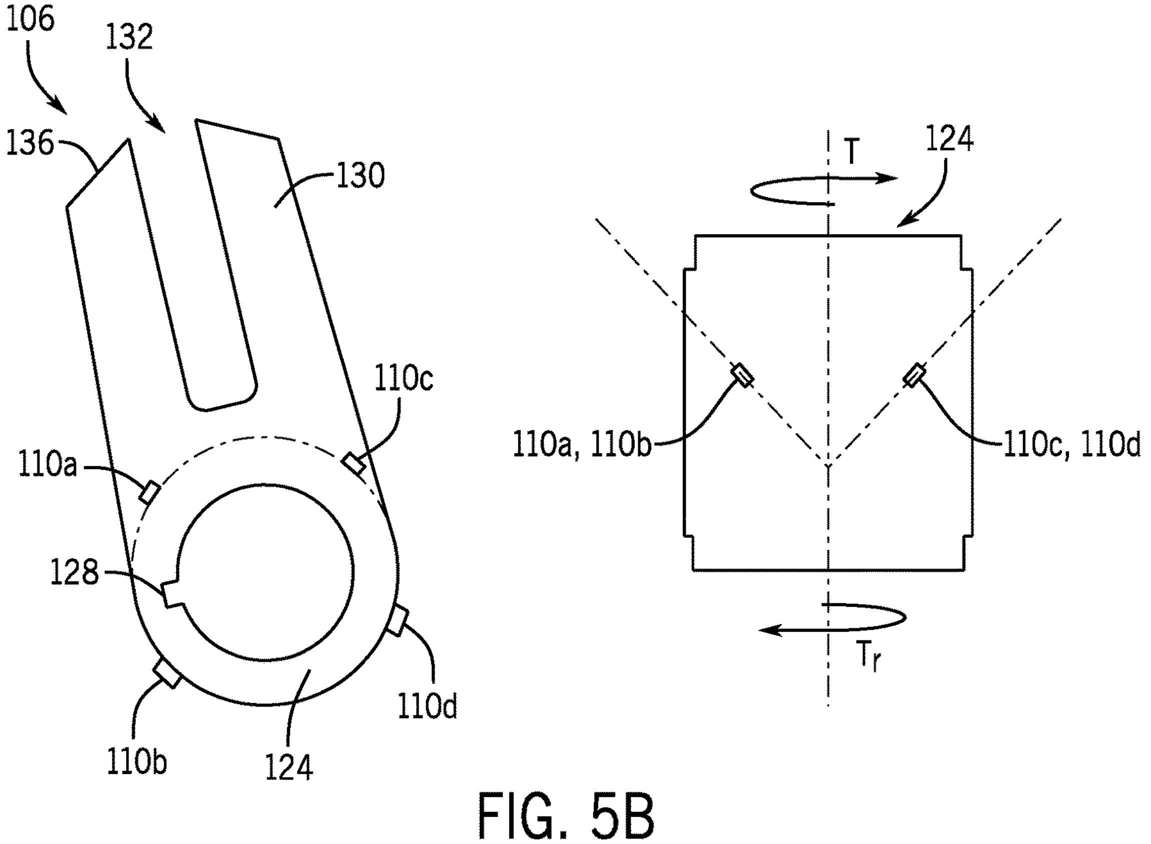
Figure 5C:
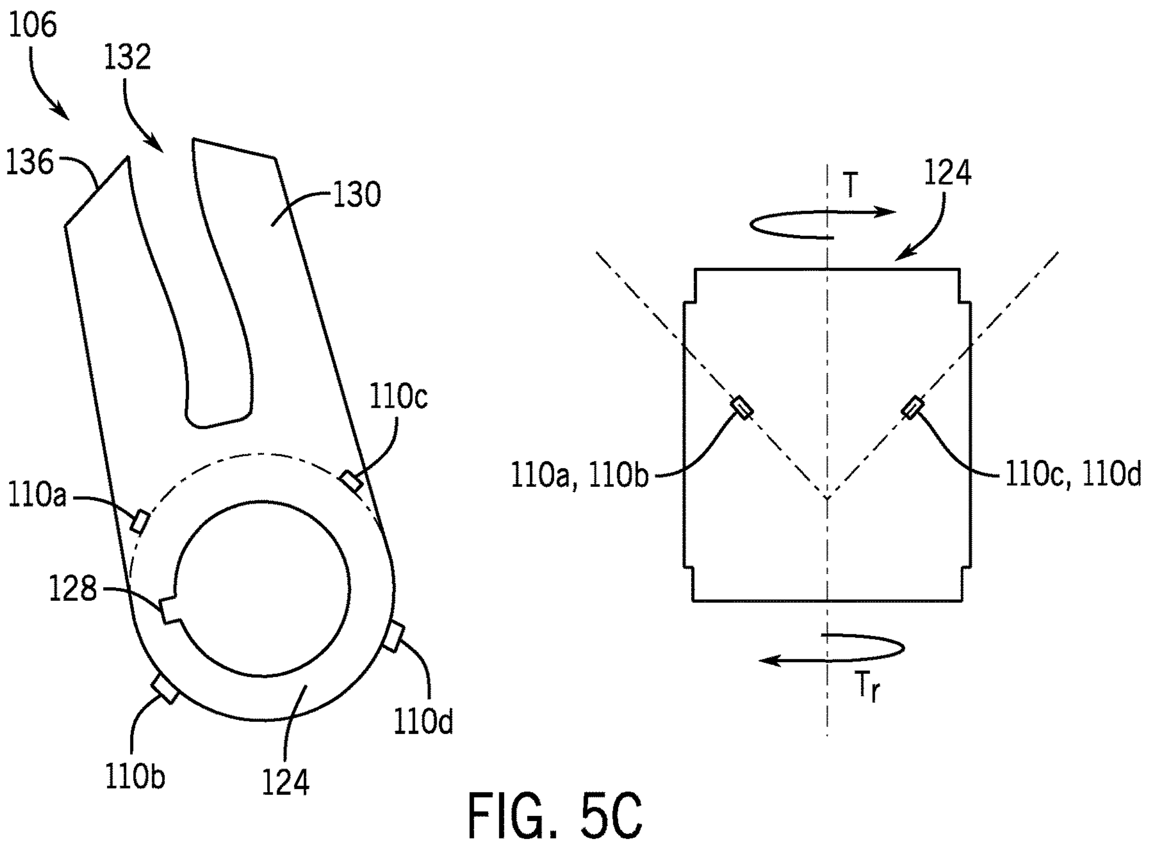
Figure 5D:
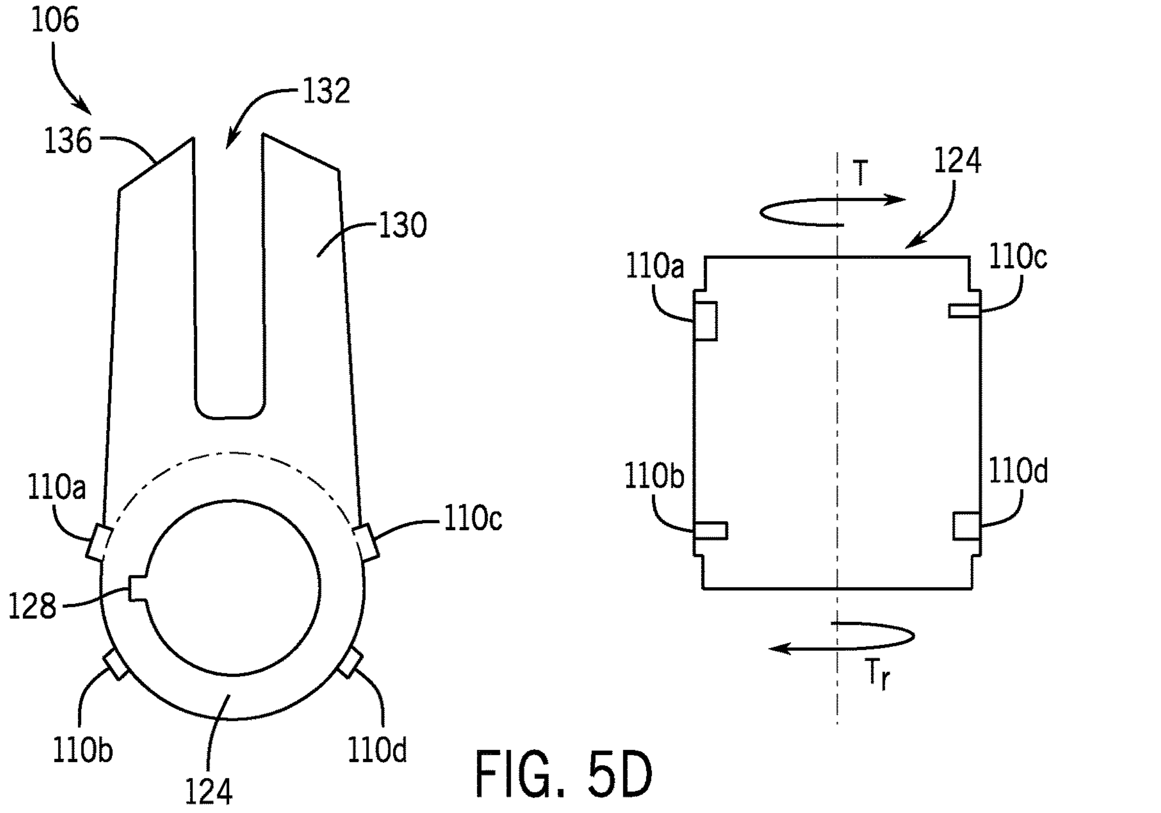
Figure 5E:
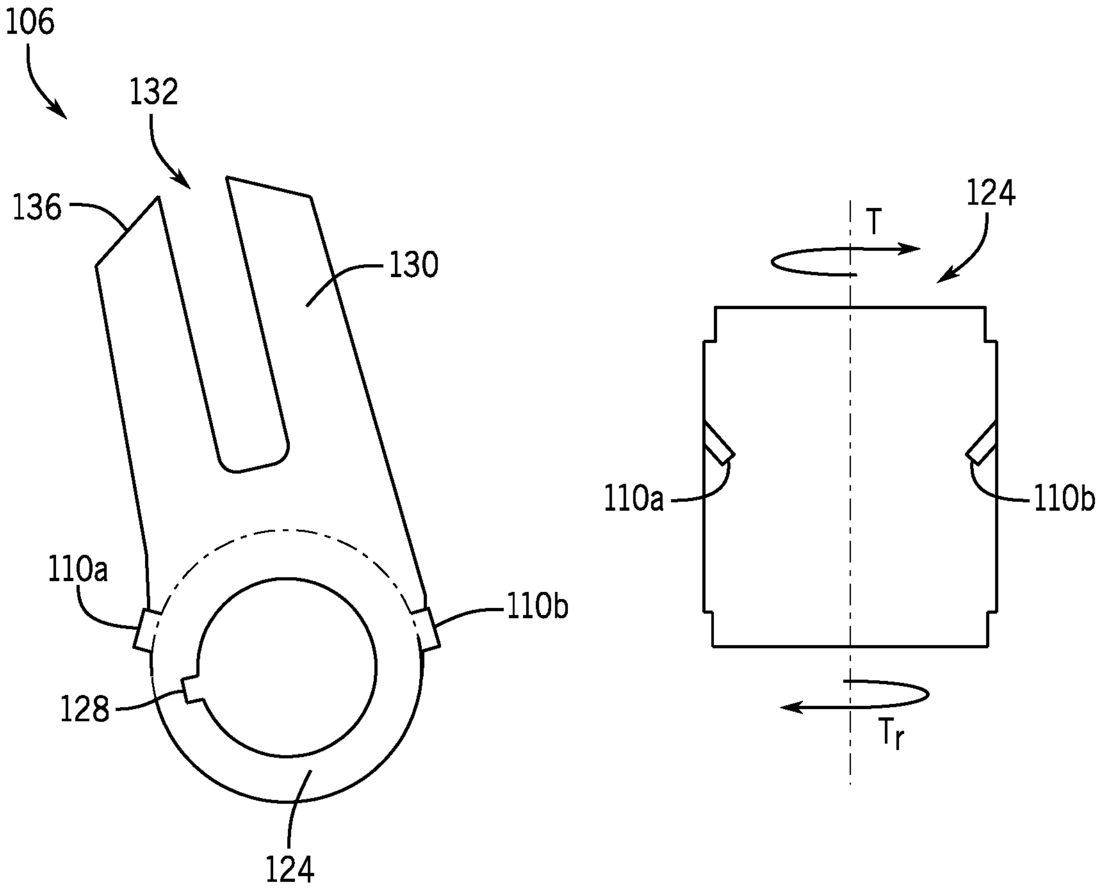
Figure 5F:
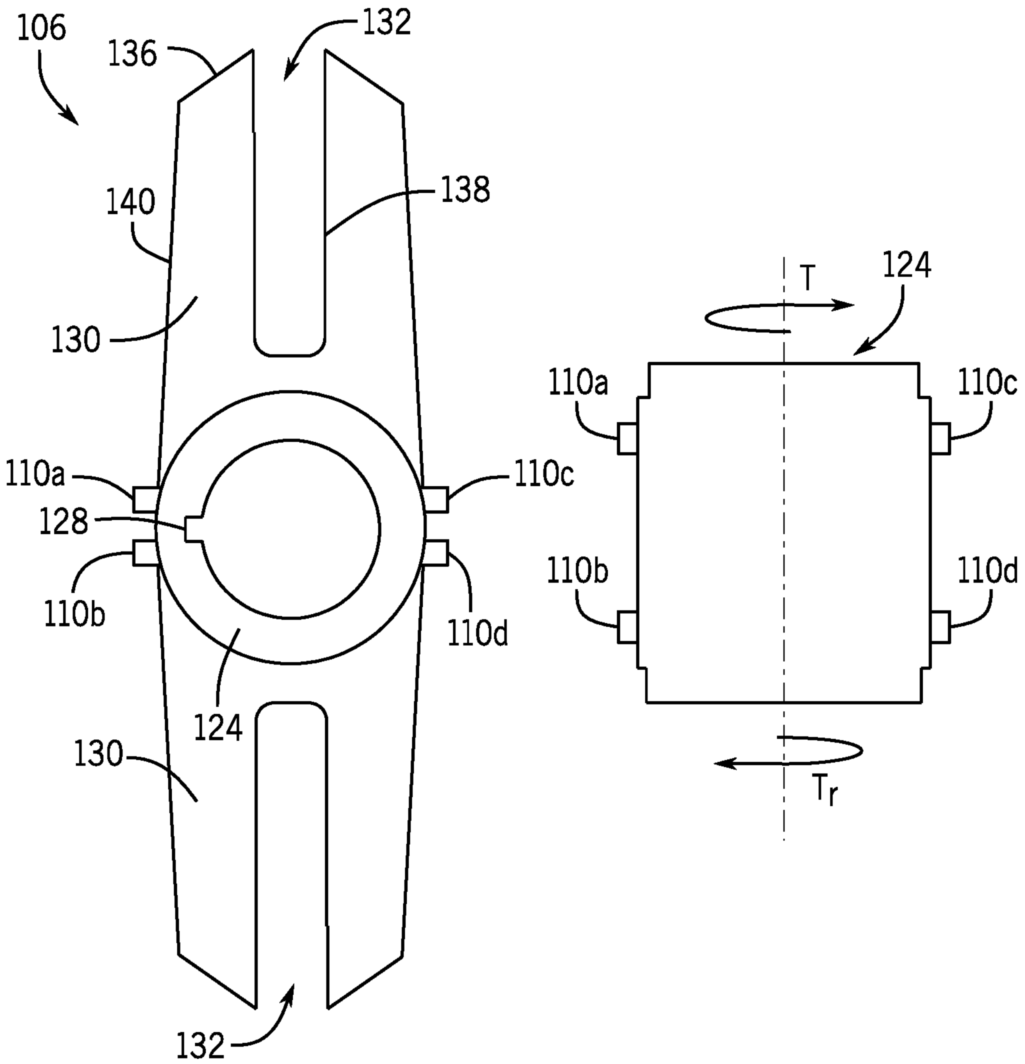
Figure 5G:
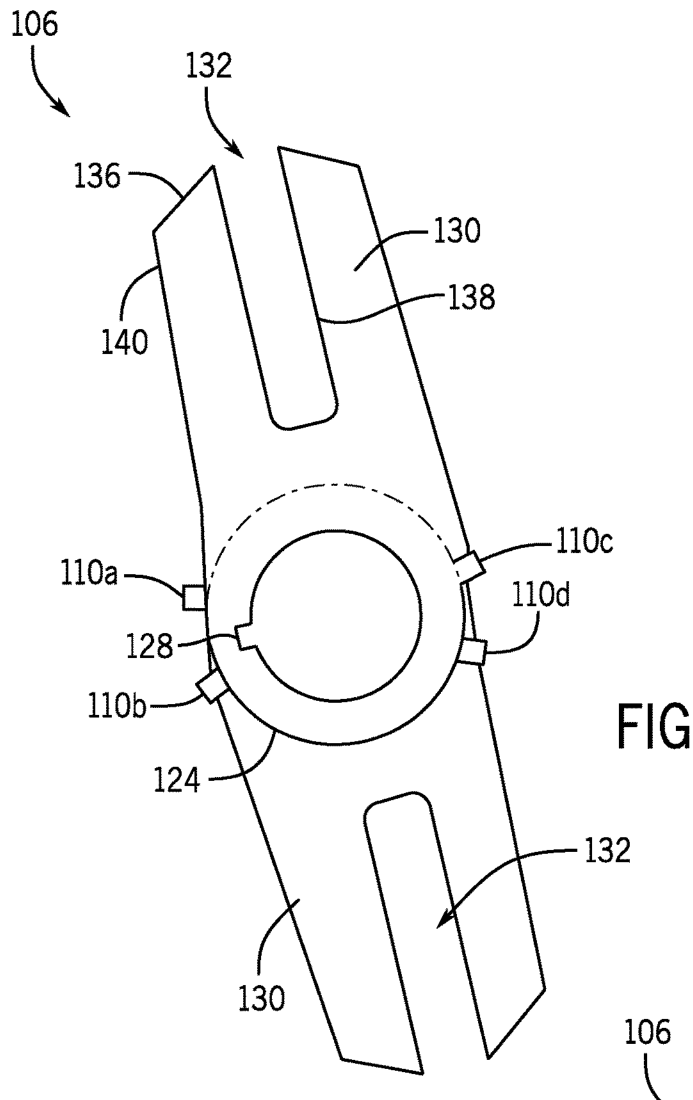

As also illustrated for the examples of FIGS. 3 and 5B-5G, the side edges 140 of the arm 130 may be symmetrical in some examples (such as, e.g., representatively illustrated in FIGS. 3, 5D, and 5F), whereas in other examples (e.g., as shown in FIGS. 5B, 5C, 5E, and 5G) the side edges 140 of the arm 130 can be canted (e.g., so that opposing side edges 140 of the arm 130 extend at different angles relative to the exterior surface of the annular sleeve 124). As shown in FIG. 5C, in some examples the slot 132 is defined by non-linear walls 138 of the arm 130, whereas in other examples the slot 132 is defined by straight walls 138 of the arm 130. In some examples, more than one arm 130 can be provided, including as shown for the opposing arms 130 in the balanced yoke torque modules 106 of FIGS. 5F and 5G.

A width of the slot 132 is generally dimensioned to be slightly greater than a width of the pin 116 carried by the push rod 114 (or, e.g., of a respective pin in the case of a multi-slot yoke). Thus, during operation of the actuator 100, the pin 116 is able to slide along a length of the slot 132 as the piston 118 (and the push rod 114 secured relative thereto) is actuated between the first position and second position (i.e., as the push rod 114 is moved in a direction indicated by the arrow in FIG. 4). As representatively illustrated by the dashed lines of FIG. 4, the movement of the pin 116 along the length of the slot 132 as the push rod 114 is moved in the direction shown by the arrow in FIG. 4 allows the pin 116 to transfer the linear movement of the push rod 114 into a rotational movement of the annular sleeve 124 about a central axis. As noted above, however, a variety of other arrangements are possible, including arrangements with differently configured slots, pins, etc. for transmission of linear force to a Scotch yoke and conversion of the linear force to rotational force on a flow control element (e.g., a ball valve element, a butterfly valve element, or other known rotatable flow element for control of flow through a valve (not shown)).

During operation of the actuator 100, reactive forces resulting from the inter-engagement between the axially extending keyway 128 formed along the interior surface of the annular sleeve 124 and the corresponding key formed along the exterior of the valve stem (not shown)—or similar interaction between other similar structures—can subject the annular sleeve 125 to varying degrees of stress or strain, which in turn can result in deformation of the annular sleeve 124. Similarly, reactive forces resulting from the inter-engagement between the pin 116 and slot 132 can subject the pin 116 and the arm 130 to varying degrees of stress or strain, which in turn can result in deformation of the arm 130 and pin 116. Accordingly, in various examples, one or more portions along any one or more of the annular sleeve 124, arm 130 or pin 116 may define torque detection regions along which deformation sensors (e.g., strain gauges 110) can be beneficially arranged. In some examples, including as detailed in FIGS. 2 through 5E, a sensor can be secured to an exterior surface of a Scotch yoke or other torque module (e.g., a radially exterior surface), including as can allow for easy installation or maintenance, as well as efficient access to the sensor for transmission of sensor signals to a separate controller.

As select examples, as representatively illustrated by FIGS. 3-5G the torque detection regions may correspond to locations along the exterior surface of the annular sleeve 124. As shown in FIGS. 5A-5C, in some such examples, the torque detection regions can correspond to locations about the circumference of the exterior surface of the annular sleeve 124 along which a plurality of strain gauges 110*a*-110*d* are arranged. In this regard, for example, each of the strain gauges 110*a*-110*d* can be oriented to measure strain at 45° with respect to the central axis. Likewise, strain gauges 110*a* and 110*d* can be located diametrically opposite one another, as can be strain gauges 110*b* and 110*c*. In some cases, the strain gauges 110*a*-110*d* can each be located at the same height relative to the annular sleeve 124, which generally corresponds to a location slightly above a mid-height of the annular sleeve 124.

In particular, the strain gauges 110*a*-110*d* in the examples of FIGS. 5A-5D, 5F, and 5G incorporate a full Wheatstone bridge (or "full bridge") configuration, inter-gauge wiring, and a zero-balance network, with corresponding relative orientations and electrical connections between the gauges 110*a*-110*d* according to generally known principles in the art. Similarly, the arrangement of the strain gauges 110*a*-110*d* can also be temperature compensated and insensitive to bending or axial stresses. In other examples, however, other arrangements of sensors can be used, including other known bridge arrangements (e.g., a half-bridge as in FIG. 5E).

According to some examples, torque detection regions (i.e., locations along which the strain gauges 110 are arranged) may correspond to a variety of one or more other locations about the exterior of the annular sleeve 124. For example, as generally discussed above, such an arrangement of the strain gauges 110 may correspond to a variety of quarter-, half-, or full-bridge configurations. In different examples, depending on the needs of a particular system, the arrangement of the strain gauges 110 may be symmetrical or asymmetrical about the exterior of the annular sleeve 124.

Generally, torque detection regions can correspond to a variety of appropriately spaced locations about the circumference of the annular sleeve 124. In some examples, sensors can be arranged with equal circumferential spacing, or otherwise with some degree of radial or reflective symmetry relative to each other. In some examples, at least one of the strain gauges 110 (e.g., strain gauge 110*a* of FIGS. 5D, 5E, and 5G), is positioned about the circumference of the annular sleeve 124 at a location adjacent the location of the axially extending keyway 128 (i.e., within the same half-circumference region, third-circumference region, quarter-circumference region, or smaller circumferential region of the annular sleeve 124 as the keyway 128). Accordingly, the sensor arrangement can beneficially identify a maximum (or near-maximum) deformation of the annular sleeve 124, as may result in more accurate assessment of applied torque.

The strain gauges 110 may also generally be secured to the annular sleeve 124 at one or more different locations along the height of the annular sleeve 124. For example, the strain gauges 110 may be located near an upper end or lower end of the annular sleeve 124 (such as, e.g., shown in FIG. 5D), at a mid-height of the annular sleeve 124 (such as, e.g., shown in FIG. 5E), etc. In some examples, at least one of the strain gauges 110 can be secured along the annular sleeve 124 at a height that is adjacent a location along the annular sleeve 124 from which the arm 130 extends (e.g., as may allow the sensor to more accurately detect deformation from the transfer of force between the arm 130 and the sleeve 124).

The orientation of the strain gauges 110 relative to the axis may be also varied, as appropriate. For example, the strain gauges 110 may be oriented at angles of 45°, 90°, etc. relative to the central axis. As representatively illustrated by FIG. 5D, in examples incorporating a plurality of strain gauges 110, the strain gauges 110 may be arranged at different angles relative to the central axis (e.g., as may allow for more accurate detection and isolation of deformation that can inform monitoring of relevant torque).

Figure 6:
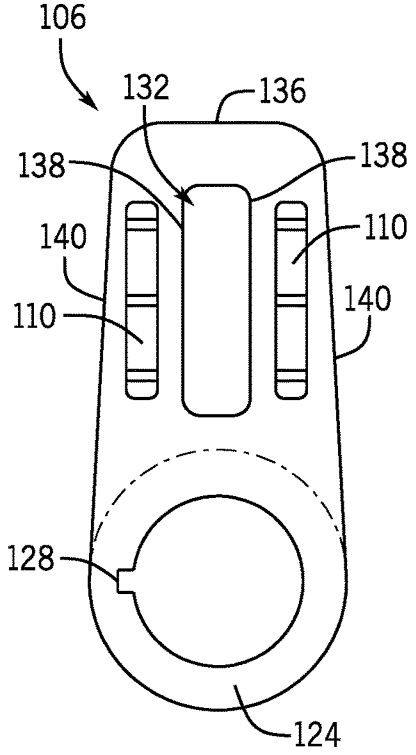
FIG. 6 is a top view of a mounting arrangement for a deformation sensor for a torque module, in accordance to one example of the present disclosure.

In addition to, or as an alternative to, the arrangement of strain gauges 110 along an exterior of the annular sleeve 124, some examples may include a sensor arranged along a drive-engagement component of Scotch yoke or other torque module. For example, as illustrated in FIG. 6, the strain gauges 110 may be secured along an upper (or other) surface of the arm 130 along one or both sides of the slot 132. Similar arrangements are also possible with one or more arms of a multi-arm yoke, including in configurations otherwise similar to the balanced yokes of FIGS. 5F and 5G. According to other examples (not shown), one or more strain gauges 110 may additionally, or alternatively, be arranged on or adjacent to the pin 116 (e.g., along a mounting block via which the pin 116 may be secured to the push rod 114).

In examples incorporating a plurality of strain gauges 110, the deformation signals obtained by different strain gauges 110 may be used by the controller for difference purposes when determining the torque output by the actuator 100, including according to generally known analysis techniques for identifying forces based on measured strain. For example, in the illustrated implementations, the location of strain gauges 110*a* and 110*b* adjacent to the keyway 128 may result in detection of a greatest (and most appropriately representative) amount of deformation during operation of the actuator 100 to drive the push rod 114 in the direction indicated by the arrow in FIG. 3. Accordingly, in some examples the controller may utilize the signals received from strain gauges 110*a* and 110*b* in determining the degree of deformation, and may utilize the deformation measurements received from strain gauges 110*c* and 110*d* to provide for temperature compensation.

In some examples, the sensing assembly of the actuator 100 can also include one or more sensor elements via which the speed or direction of the movement of the actuator 100 may be monitored. For example, as shown in FIGS. 2 and 3, the actuator 100 additionally includes a gyroscope 112 or other rotational/angular velocity sensor (e.g., known inertial management units or other known motion detection systems). Generally, the gyroscope 112 may be secured at various locations along a moveable portion of the actuator 100. For example, the location at which the gyroscope 112 is mounted may be selected to minimize the risk of the gyroscope 112 interfering with the other moving components of the actuator 100 during operation, and to facilitate wiring of the gyroscope 112 to the controller (not shown). As illustrated by FIGS. 2 and 3, in various examples, the gyroscope 112 can be secured along an upper surface of the arm 130 of the torque assembly 106.

As also discussed above, the location/speed measurements provided by the gyroscope 112 and the deformation measurements provided by the strain gauges 110 can allow the controller of the actuator 100 to provide real-time torque and movement information. By monitoring trends in the measurements obtained using the gyroscope 112 and strain gauges 110, and comparing these measurements against baselines measurements, the controller of the actuator 100 may thus be able to measure or calculate relevant metrics for the operation of the flow-control valve 200 to which the actuator 100 is mounted, including as may indicate a stuck valve or other valve malfunction, deficiency in torque delivery, or other issues.

In some examples the actuator 100 may include an existing actuator that has been retrofitted to provide the existing actuator with the ability to provide real-time torque or movement information (e.g., as generally described with reference to the actuator 100). For example, according to one example method of providing an existing actuator with the improved torque and movement monitoring functionalities of an actuator 100 as described herein, a Scotch yoke torque transfer member of an existing actuator may be replaced with a Scotch yoke torque transfer module 106 having one or more strain gauges 110 and a gyroscope 112 secured thereto. The strain gauges 110 and gyroscope 112 may be wired to an existing controller of the actuator, if any (or an existing controller, if any, may be replaced with a controller as described herein), As needed, the firmware of the controller may then also be updated to allow for the processing of the measurements obtained by the strain gauges 110 and gyroscope 112. In such a retrofit arrangement, the dimensions and configuration (e.g., arrangement of the arm 130, length/width of the slot 132) of the torque module 106 may be selected to correspond to dimensions and configuration of the existing torque transfer member to facilitate the replacement of the existing torque transfer member with the torque module 106.

While the actuator herein disclosed has been described in terms of specific examples and applications thereof, numerous modifications and variations could be made thereto by those skilled in the art without departing from the scope of the disclosed technology set forth in the claims. For example, the actuator 100 shown and described with reference to the Figures includes a pneumatically/hydraulically powered drive module 104 and a torque module 106 including a Scotch yoke. However, according to other examples the actuator 100 may include a drive module or torque module defined by a variety of other structures. For example, the torque module may include other structures that-similar to the Scotch yoke torque module 106 described above-include surfaces that undergo varying degrees of deformation responsive to changing torque outputs, along which deformation sensors can be secured. As one example, the torque module may include a pinion wheel and the drive module may include a rack (e.g., with sensors secured to measure deformation of the pinion wheel). Similarly, although the drive module has been described as being pneumatically/hydraulically driven, in other examples the drive module may be powered by other types of power sources (e.g., may be motor-driven, manually operated, etc.).

In some implementations, devices or systems disclosed herein can be utilized, manufactured, installed, etc. using methods embodying aspects of the disclosed technology. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure of the utilized features and implemented capabilities of such device or system as examples of the disclosed technology.

In some examples, aspects of the disclosed technology, including computerized implementations of methods according to the disclosed technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, aspects of the disclosed technology can be implemented as a set of instructions, tangibly embodied on a non-transitory computer-readable media, such that a processor device can implement the instructions based upon reading the instructions from the computer-readable media. Some examples of the disclosed technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some examples, a control device can include a centralized hub controller that receives, processes and (re) transmits control signals and other data to and from other distributed control devices (e.g., an engine controller, an implement controller, a drive controller, etc.), including as part of a hub-and-spoke architecture or otherwise.

The term “article of manufacture” as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosed technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGURES, or otherwise disclosed herein, can be executed in different orders than are expressly illustrated or described, as appropriate for particular examples of the disclosed technology. Further, in some examples, certain operations can be executed in parallel, including by dedicated parallel processing devices, or separate computing devices configured to interoperate as part of a large system.

As used herein in the context of computer implementation, unless otherwise specified or limited, the terms “component,” “system,” “module,” “block,” “device,” and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or” as used herein is intended to indicate exclusive alternatives only when preceded by terms of exclusivity, such as “either,” “one of,” “only one of,” or “exactly one of.” For example, a list of “one of A, B, or C” indicates options of: A, but not B and C; B, but not A and C; and C, but not A and B. A list preceded by “one or more” (and variations thereon, e.g., “at least one of”) and including “or” to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

We claim:

1. An actuator for selectively controlling movement of an actuatable flow control element between a first configuration and a second configuration to control flow of fluid through a valve, the actuator comprising:

a torque module that includes:

an attachment body rotatable relative to a rotational axis and configured to engage a rotatable stem of the flow control element; and a drive-engagement component extending radially outwards from the attachment body, relative to the rotational axis, the drive-engagement component including an arm having a first end secured along an exterior of the attachment body and a free end;

a drive module that includes:

a drive member; and a force-transfer element attached to the drive member and engaged with the drive-engagement component of the torque module;

wherein, responsive to a movement of the drive member, the force-transfer element is configured to apply a torque to the torque module, via the drive-engagement component, for operation of the flow control element to control fluid flow;

a housing that encloses at least one of the torque module or the drive module; and a torque-sensing system within the housing, the torque-sensing system including a sensor element arranged on the arm and configured to detect a deformation of at least one of the torque module or the force-transfer element along an axis that extends transverse to the rotational axis, in response to operation of the drive module to apply a torque to the torque module via the drive-engagement component.

2. The actuator of claim 1, wherein the torque module comprises a Scotch yoke that includes the attachment body and the drive-engagement component.

3. The actuator of claim 1, wherein the attachment body comprises an annular sleeve centered about the rotational axis.

4. The actuator of claim 3, wherein the sensor element is attached along an exterior surface of the annular sleeve.

5. The actuator of claim 4, further comprising:

a securement structure configured to engage the rotatable stem of the flow control element, the securement structure being located along an inner surface of the annular sleeve;

wherein the sensor element is attached along the exterior surface of the annular sleeve adjacent to the securement structure.

6. The actuator of claim 5, wherein the securement structure comprises a keyed engagement feature formed along the inner surface of the annular sleeve; and wherein the sensor element is attached along the exterior surface of the annular sleeve with the sensor element and the securement structure within a common quarter-circumference region of the annular sleeve.

7. The actuator of any of claim 1, wherein the sensor element comprises a strain gauge arranged to detect a deformation of the attachment body in a circumferential direction.

8. The actuator of claim 7, wherein the sensor element comprises a plurality of strain gauges.

9. The actuator of claim 8, wherein the strain gauges are arranged in a full-bridge configuration.

10. A Scotch yoke for actuation of a valve, the Scotch yoke comprising:

an attachment body rotatable relative to a central axis;

a securement structure on the attachment body to secure the attachment body to a flow control element of the valve, via attachment to a corresponding structure of a rotatable stem of the flow control element;

a drive-engagement component extending radially outwards from the attachment body, relative to the central axis, the drive-engagement component including an arm having a first end secured along an exterior of the attachment body and a free end, the drive-engagement component being engageable by a drive module of an actuator to apply a torque to the attachment body and thereby transmit torque from the drive module to the flow control element; and a sensor element arranged on the arm of the drive-engagement component, wherein, responsive to an application of a torque to the attachment body, the sensor element detects a deformation of the drive-engagement component along an axis that extends transverse to the central axis.

11. The Scotch yoke of claim 10, wherein the sensor element comprises a strain gauge.

12. The Scotch yoke of claim 11, wherein the Scotch yoke comprises multiple sensor elements formed as a plurality of strain gauges arranged in a Wheatstone bridge configuration.

13. The Scotch yoke of claim 10, wherein a slot extends radially inward along the arm from the free end of the arm; and wherein the sensor element is arranged adjacent the slot.

14. A method of monitoring operation of a valve, the method comprising:

during movement of a drive module of an actuator of the valve that applies torque to an attachment body of a Scotch yoke of the valve via a drive-engagement component, the drive-engagement component defining an arm having a first end secured along an exterior of the attachment body and a free end that extends from the attachment body, detecting strain on the drive-engagement component with a sensor element arranged on the arm of the drive-engagement component; and determining a torque applied to the Scotch yoke based on the detected strain.

* * * * *